June 3, 1930. J. WICKER 1,761,001
WEEDER
Filed May 14, 1929 2 Sheets-Sheet 1

INVENTOR.
John Wicker
BY
ATTORNEY.

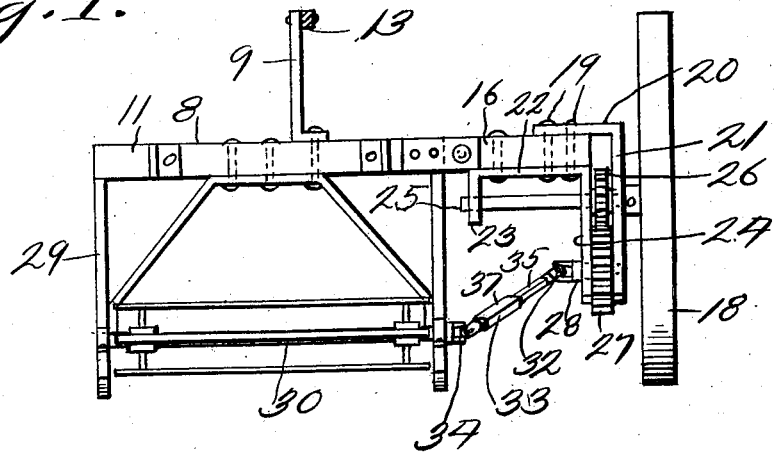

Patented June 3, 1930

1,761,001

UNITED STATES PATENT OFFICE

JOHN WICKER, OF SPRAGUE, WASHINGTON

WEEDER

Application filed May 14, 1929. Serial No. 363,017.

The invention relates to weeders of the riding and wheel supported type, and has for its object to provide a device of this character wherein a frame is pivotally connected to the forward end of the device, and provided with ground engaging runners arcuately shaped in relation to their pivotal points whereby a rotatable cutter reel carried by the runners may be varied in relation to the ground upon pivotal movement of the pivoted frame.

A further object is to provide the pivoted frame with an extension member, the outer end of which is provided with downwardly extending spaced arms between which meshing gears are rotatably mounted. Also to provide a rotatable shaft in said arms and on which one of said gears is mounted, a ground engaging wheel carried by the outer end of the shaft and an extensible shaft having one of its ends universally connected to the other gear and its other end universally connected to the cutter reel, thereby allowing pivotal movement of the pivoted frame and obviating close adjustment of parts.

A further object is to provide the pivoted frame bar with an extension member preferably pivoted thereto and having limited movement, a right angle bracket having one of its arms secured to the upper side of the extension member and its other arm extending downwardly spaced from the end of the extension member and a U-shaped bracket having its transverse portion secured to the under side of the extension member with one of its arms spaced from the downwardly extending arm of the first mentioned bracket, and both of its arms forming spaced bearing supports for the wheel carried shaft.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 4 is a rear elevation of the pivoted frame, showing the same detached from the main frame of the device to better illustrate the structure.

Figure 5 is a view in elevation of the extensible drive shaft.

Figure 1:
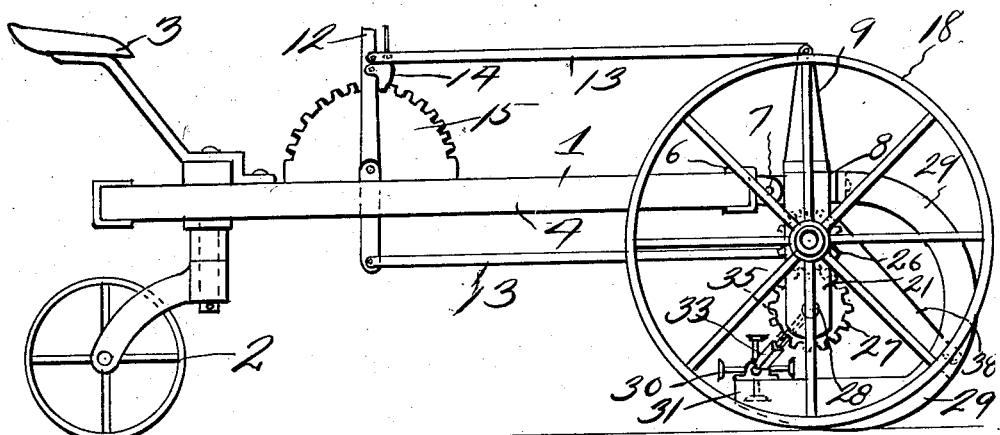
Figure 1 is a side elevation of the weeding machine.
Figure 2:
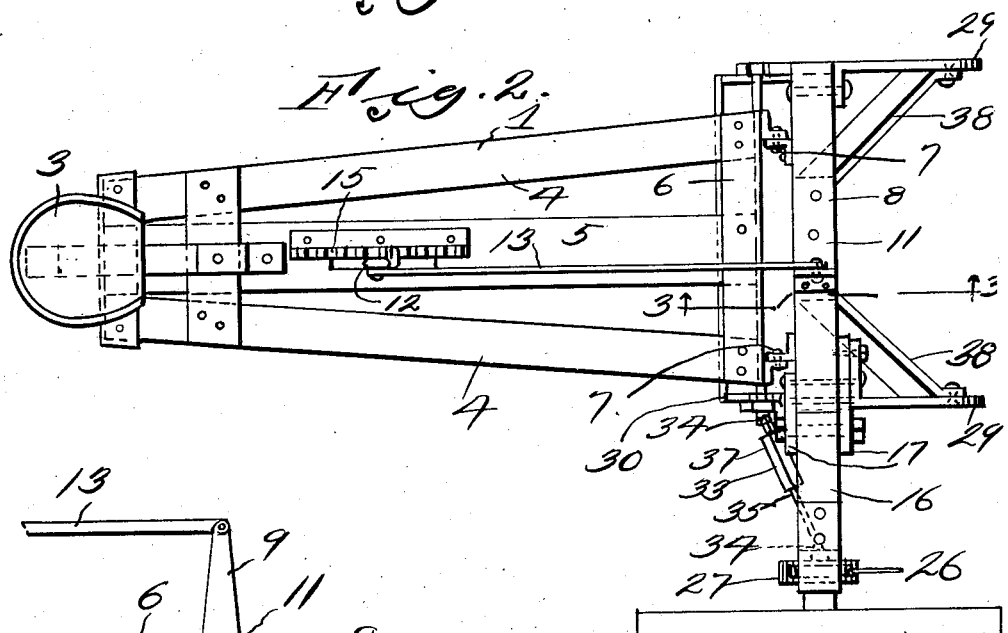
Figure 2 is a top plan view of the machine.
Figure 3:
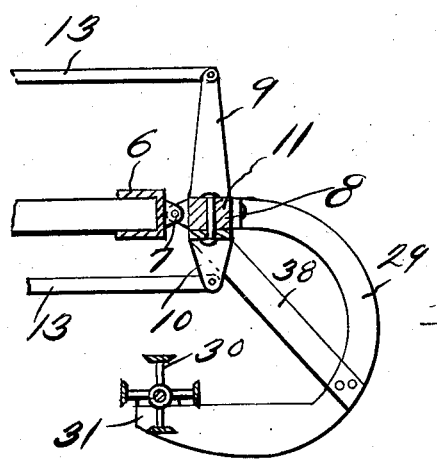
Figure 3 is a vertical transverse sectional view through the forward end of the machine taken on line 3—3 of Figure 2.

Referring to the drawings, the numeral 1 designates the horizontal frame of the machine, which frame preferably tapers towards its rear end and is supported at its rear end by a conventional form of pivoted caster wheel 2. Supported above the rear end of the frame 1 is a seat 3 adapted to be occupied by the operator for controlling the weeder as it is moved over the ground in any suitable manner, for instance by tractor or draft animals, applicant not limiting himself in this particular. The frame 1 is preferably formed from bars 4 and 5, which bars have their forward ends connected together by a channel bar 6. Pivotally connected at 7 to the forward side of the channel bar 6 is the movable frame 8, which frame is controlled in its pivotal movement by means of arms 9 and 10 extending upwardly and downwardly from the bar 11, and by the pivoted lever 12 having link connections 13 with the arms 9 and 10, therefore it will be seen that the operator may pivotally move the frame 8 as the machine moves over the ground, and said frame will be held in various adjusted positions by means of the dog 14, which cooperates with the toothed segment 15 carried by the frame 1.

Secured to the outer end of the bar 11 is an extension bar 16, which bar is preferably secured by means of plates 17 and may have a limited downward pivotal movement. The extension bar 16 extends beyond the side of the frame 1 and supports the ground engaging wheel 18 which operates the cutter mechanism hereinafter set forth.

Secured to the upper side of the extension bar 16 by means of rivets 19 is the arm 20 of a right angularly shaped bracket, the arm 21 of which extends downwardly adjacent the ground engaging wheels 18. Secured by means of rivets 19 to the underside of the extension 16 is U-shaped bracket 22 having its arms 23 and 24 in spaced relation to each other and the arm 24 in spaced relation to the arm 21 of the bracket 20, but in parallel relation thereto. Rotatably mounted in bearings of the arms 21, 24 and 23 is a horizontal shaft 25, on the outer end of which is mounted a ground engaging wheel 18. By providing the U-shaped bracket 22, it is obvious a two point bearing is provided for the shaft, thereby bracing the same. Shaft 25 has mounted thereon between the arms 21 and 24 an operating gear 26, which gear meshes with the gear 27, also disposed between the arms 21 and 24 and provided with a shaft 28, the ends of which are rotatably mounted in bearings of said arms. It will be seen that as the machine moves over the ground, the ground engaging wheel 14 will impart rotation to the shaft 25 and gears 26 and 27 for operating the mechanism hereinafter set forth.

Secured to the forward side of the bar 11 are forwardly, downwardly and rearwardly curved spaced runners 29, which runners engage the ground during the weed cutting operation, and it will be seen by adjusting or pivotally moving the frame 8, the rotatable cutter reel 30, mounted on the rear end 31 of the runners, may be adjusted in relation to the ground for regulating the cut or raised a substantial distance from the ground when transporting the device from place to place. By referring to Figure 1, it will be noted that upon extreme rotation or pivotal movement of the frame in one direction, the ground engaging wheel 18 will be raised out of engagement with the ground.

Universally connected at 32 to the short shaft 28 is an extension rod 33, the other end of which has a universal connection 34 to the cutter reel 30, therefore it will be seen that as the device moves over the ground with the ground engaging wheel in engagement with the ground, rotation will be imparted to the cutter reel for cutting weeds, and the operator by simply manipulating the control lever 12 may pivotally move the runners 29 downwardly for raising the ground engaging wheel 18 out of engagement with the ground for stopping the rotation of the cutter reel, therefore it will be seen that the cutter reel will be under control at all times, and if so desired, the operator may manipulate the pivoted frame 8 in a manner whereby the distance between the cutter reel and the ground may be varied for varying the length of the cut of the weeds. The extensible shaft 33 comprises a rectangular portion 35, which is slidably mounted in a rectangular shaped bore 36 in a sleeve 37, therefore it will be seen that an angular driving connection is provided between the gear 27 and cutter reel 30, which will accommodate itself to the various positions of the parts in relation to each other and to variations incident to manufacture or use of the device. The runners 29 are preferably braced by U-shaped brace 38, having its arms anchored to the inner sides of the runners and its transverse portion anchored to the underside of the bar 11.

From the above it will be seen that a weed cutting machine is provided which is simple in construction, the parts reduced to a minimum and one wherein a cutter reel is driven by a ground engaging wheel, which wheel may be easily and quickly placed in engagement with the ground for operating the cutter reel as desired.

The invention having been set forth what is claimed as new and useful is:

1. A weed cutting machine comprising a main frame, wheel means for supporting the rear end of said main frame, a pivoted reel carrying frame carried by the forward end of the main frame, said reel carrying frame comprising runner members curving forwardly, downwardly and rearwardly, a rotatable cutter reel carried by the rear end of the runners, a ground engaging wheel carried by one side of the reel frame and outside the runners and driving connections between the ground engaging wheel and the reel.

2. A weed cutting machine comprising a main horizontal frame, a ground engaging wheel at the rear end of said frame, a reel carrying frame pivotally connected to the forward end of the main frame, said reel carrying frame comprising a transverse bar, runners carried by the bar, said runners curving forwardly, downwardly and rearwardly beneath the bar, said runners terminating rearwardly of the bar, a cutter reel carried by the rear ends of the runners, one end of said bar extending beyond the side of the main frame, a downwardly extending bracket carried by said last named end of the bar, a ground engaging wheel carried by said bracket and driving connections between said ground engaging wheel and the cutter reel.

3. A weed cutting machine comprising a main wheel supported frame, a reel carrying pivoted frame carried by the forward end of the main frame, ground engaging runners carried by the pivoted frame and curving forwardly and downwardly and rearwardly, a cutter wheel rotatably mounted on said runners, a ground engaging wheel carried by the pivoted frame, driving connections between the ground engaging wheel and the reel and control means for pivotally moving the pivoted frame.

4. A weed cutting machine comprising a horizontally disposed frame, a ground engaging wheel carried by the rear end of the frame, a pivoted frame carried by the forward end of the main frame, said pivoted frame having arcuately shaped ground engaging runners, a reel carried by said runners, a ground engaging wheel carried by the pivoted frame, driving connections between said last named ground engaging wheel and the reel, said wheel and runners being shaped whereby upon pivotal movement of the frame in one direction the wheel be moved into engagement with the ground for imparting rotation to the reel and upon pivotal movement in opposite direction said runners will be moved into engagement with the ground and the wheel out of engagement with the ground.

5. A weed cutting machine comprising a main frame, a pivoted frame carried by the forward end of the main frame, arcuately shaped runners carried by the pivoted frame and adapted to engage the ground, means for pivotally moving the pivoted frame, a ground engaging wheel carried by the pivoted frame, a cutter reel carried by the runners, the ground engaging wheel having a driving connection with the reel, said runners extending beyond the periphery of the ground engaging wheel at one position whereby upon pivotal movement of the pivoted frame in one direction the ground engaging wheel may be forced out of engagement with the ground or upon pivotal movement in the opposite direction said wheel will be moved into engagement with the ground.

6. A weed cutter comprising a main frame, a pivoted runner supported reel frame, a ground engaging drive wheel for the reel mounted on the pivoted reel frame, said runner supported frame being shaped whereby upon pivotal movement of the pivoted frame the ground engaging wheel can be placed in engagement with the ground or raised out of engagement with the ground.

7. A weed cutting machine comprising a main frame, a pivoted frame carried by said main frame, ground engaging runner supports for said pivoted frame, a reel carried by said pivoted frame, driving connections between said ground engaging wheel and the reel, said driving connections comprising a shaft carried by the wheel, a countershaft beneath the first mentioned shaft, gear connections between said shafts, a drive shaft connection between the countershaft and the reel, said drive shaft having its ends universally connected to the countershaft and the reel.

8. A weed cutting machine comprising a main frame, a pivoted frame carried by said main frame, ground engaging runner supports for said pivoted frame, a reel carried by said pivoted frame, means for driving said reel from the ground engaging wheel, said means comprising an extension bar extending outwardly from one side of the pivoted frame, downwardly extending spaced arms carried by said extension bar, a shaft carried by the ground engaging wheel and rotatably mounted in bearings of the arms, a countershaft rotatably mounted in bearings of the arms, drive gear connections between the shafts and located between the arms, an angularly disposed drive shaft connection between the countershaft and the reel, said angularly disposed drive shaft connection having universal connection to the countershaft and the reel.

In testimony whereof he hereunto affixes his signature.

JOHN WICKER.